United States Patent [19]

Jain

[11] 4,039,253
[45] Aug. 2, 1977

[54] OPTICAL DISPLAY HAVING DISHED COVER PLATE

[75] Inventor: Anil K. Jain, Eagleville, Pa.

[73] Assignee: ICI United States Inc., Wilmington, Del.

[21] Appl. No.: 678,629

[22] Filed: Apr. 20, 1976

[51] Int. Cl.² .............................................. G02F 1/36
[52] U.S. Cl. .................................. 350/160 R; 356/246
[58] Field of Search ................. 350/160 R, 160 LC; 340/324 EC, 336, 378 R; 58/50 R; 356/246

[56] References Cited

U.S. PATENT DOCUMENTS

| 3,846,015 | 11/1974 | Moi | 350/160 LC |
|---|---|---|---|
| 3,886,014 | 5/1975 | Bayer | 350/160 LC |
| 3,973,388 | 8/1976 | Yoshida et al. | 350/160 LC |

*Primary Examiner*—Stanley D. Miller, Jr.

[57] ABSTRACT

Optical devices and especially electrochromic devices comprising a sealed cell containing an aqueous medium and having a pair of opposed walls, at least one of which is transparent. Breakage due to freezing is minimized by providing a cell in which one of the walls is dished, having a main portion which is parallel to the other wall and a sloping peripheral portion surrounding the main portion and intersecting the other wall at an angle not greater than 30°.

12 Claims, 4 Drawing Figures

U.S. Patent  Aug. 2, 1977  4,039,253 and containing an electrolyte which preferably in-

OPTICAL DISPLAY HAVING DISHED COVER PLATE

BACKGROUND OF THE INVENTION

This invention relates to thin cells containing aqueous media, and particularly to optical devices of this type. More particularly this invention relates to electrochromic devices.

U.S. Pat. Nos. 3,451,741 to Manos and 3,453,038 to Kissa et al. describe electrochromic devices in the form of a thin sealed cell having a pair of parallel plates or walls, at least one of which is transparent and preferably glass, separated by a spacer. The electrodes in a typical cell are thin conductive tin oxide coatings on the inside surfaces of the two opposite walls. One of the electrodes may have segments providing a digital display. A typical cell thickness is from about 0.01 to about 0.1 inch. Alternatively, according to the teachings of Manos the electrodes may be coplanar, i.e., both the display electrode and the counter electrode are formed on the inside surface of the same wall. The cell is filled with an aqueous electrolyte containing a pair of reversibly oxidizable and reducible materials, (i.e., redox materials), one of which is colored in one oxidation state and colorless or substantially colorless in another oxidation state. The material which undergoes color change will be referred as an electrochromic material. By applying a voltage of one polarity, a color is caused to appear at one electrode or at selected segments thereof. This color may be erased by reversing the polarity. The second redox material which is substantially colorless in both oxidation states, will cause erasure of the color when no voltage is applied.

Various other electrochromic devises have been suggested. For example, U.S. Pat. Nos. 3,712,709 to Kenworthy and 3,930,717 to McDermott et al. describe digital display devices in which the electrochromic material is a water soluble N,N'-di-(p-cyanophenyl) 4,4'-bipyridinium salt, preferably the chloride or sulfate, dissolved in an aqueous electrolyte. The electrochromic material in these references forms a green radical at the cathode upon application of an electric field. The electrolyte of McDermott et al. is an acidic (pH preferably about 2) electrolyte which also contains ferrous ammonium sulfate as a secondary redox material which causes erasure of the green image at the cathods when no voltage is applied. A preferred electrolyte, described in Example 1 of McDermott et al., contains 0.01 M N,N'-di-(p-cyanophenyl) 4,4'-bipyridinium dichloride and 0.5 M ferrous ammonium sulfate, acidified with sulfuric acid to pH 2.

Other digital electrochromic display devices using a bipyridinium salt as the electrochromic material are shown for example in U.S. Pat. Nos. 3,806,229 to Schoot et al. and 3,912,368 to Ponjee et al. Pongee et al. illustrates a coplanar electrode arrangement in which a segmented digital display electrode, a counter electrode and a reference electrode, are all formed on the same surface of a common substrate. Tin oxide and gold are among the electrode materials mentioned; among the substrates mentioned are glass and Perspex, both of which are transparent. U.S. Pat. No. 3,652,149 illustrates a variable density electrochromic light filter employing a bipyridinium salt as the electrochromic material.

The electrochromic material can be a permanent solid layer on one electrode, as disclosed for example in U.S. Pat. No. 3,521,941 to Deb et al.

U.S. Pat. No. 3,839,857 to Berets et al. describes an electrochromic watch.

One problem encountered with thin cells of the type shown in the Manos and Kissa et al. patents is that the glass wall or walls may be broken by freezing of the electrolyte. Since water and aqueous media expand on freezing, considerable pressure builds up inside the cell when the electrolyte freezes, and this tends to cause the glass wall or walls to break. Breakage is most apt to occur near the spacer. This tendency to break is a problem in electrochromic cells, such as those in watch displays, which are used outdoors. The tendency to break is a problem even in cells that are used indoors, such as cells used in clock displays, since breakage may occur if cells are shipped in subfreezing temperatures. Addition of ethylene glycol to the electrolyte may cause undersirable side reactions and is therefore undesirable, even though this would lower the freezing point of the electrolyte. It is necessary for at least one cell wall to be made of glass or transparent plastic for viewing. Flexible sheet materials such as rubber and plastics (e.g., flexible vinyls) are not desirable from a structural standpoint; therefore, essentially inflexible materials such as glass, ceramincs, and so-called rigid plastics, which are breakable, must be used.

SUMMARY OF THE INVENTION

According to the present invention, it has been found that substantially improved resistance to breakage caused by freezing in sealed optical cells containing an aqueous medium is achieved by providing, as one of the walls, a dished plate having a central portion that is spaced from the other plate and a sloping peripheral portion extending from the central portion towards the other plate and disposed at an acute angle, preferably not greater than 30°, thereto. Preferred optical cells of this type are electrochromic devices containing a pair of electrodes of opposite polarity and containing, as the aqueous medium, an electrolyte which includes an electrochromic material.

DRAWING

DESCRIPTION OF PREFERRED EMBODIMENT

Figure 1:
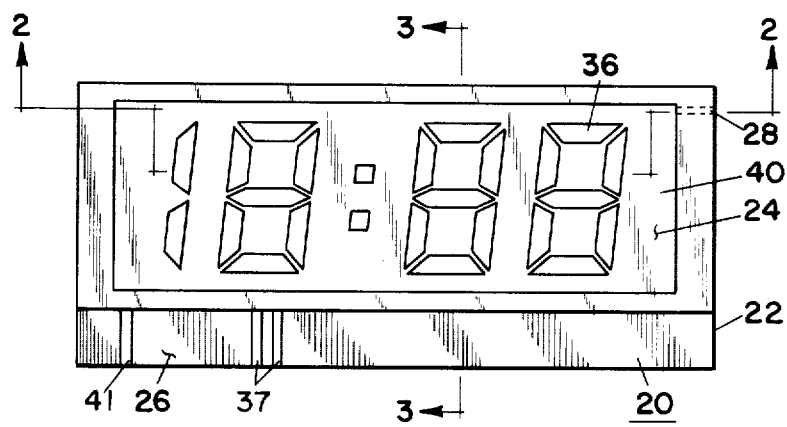
FIG. 1 is a plan view of an electrochromic device according to a preferred embodiment of this invention.
Figure 2:
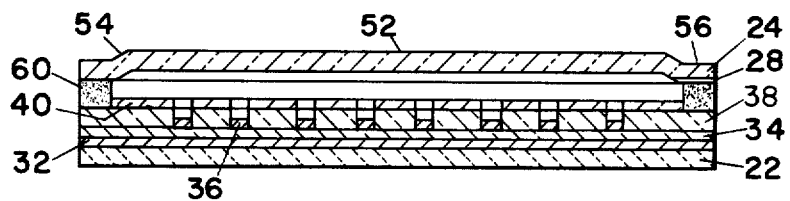
FIG. 2 is a vertical longitudinal sectional view taken on line 2—2 of FIG. 1.
Figure 3:
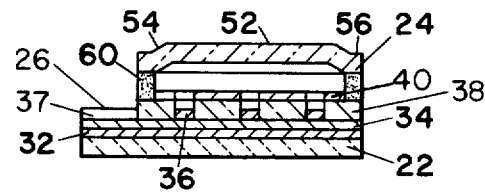
FIG. 3 is a vertical transverse sectional view taken on line 3—3 of FIG. 1.
Figure 4:
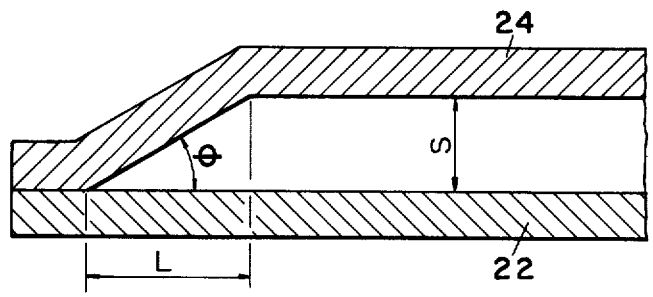
FIG. 4 is an enlarged and simplified framgmentary sectional view taken on line 2—2 of FIG. 1.

The preferred embodiment of this invention is an electrochromic display devices of the digital type which is suitable for clocks and watches. These devices include a flat base plate having a thin layer electrode in the form of a plurality of digit segments thereon, a dished transparent cover plate, a counter electrode, and an aqueous conductive solution containing a material which undergoes a reversible change in color and/or optical density upon the application of an electric field.

Referring now to FIGS. 1 to 4, 20 indicates generally an electrochromic display device in the form of a thin sealed cell which is filled with an aqueous electrolyte.

The device includes a thin flat rectangular base plate (or first plate) 22 and a thin dished rectangular cover plate (or second plate) 24 which are joined together to form opposed walls of the cell. At least one of these plates is transparent. The two plates preferably have the same length but the base plate is preferably wider than the cover plate, so that the base plate 22 has an exposed area 26 and a free edge which are not covered by the cover plate 24. The base plate 22 and cover plate 24 are joined together around the perimeter of the cover plate so that three edges of the cover plate are aligned with the corresponding edges of the base plate. The cell 20 also has a fill hole 28 through which the electrolyte solution is introduced. This fill hole is sealed with a suitable sealing material (preferably a plastic) after the cell is filled with electrolyte.

The base plate 22 may be either transparent or opaque and may be made of glass, an opaque ceramic material such as alumina, or a plastic material such as polyvinyl chloride or polycarbonate. Glass and ceramic materials are ordinarily preferred because of their low oxygen permeability. Low oxygen permeability is desirable in electrochromic devices because some electrochromic materials and secondary redox materials, including ferrous salts which are preferred secondary redox materials herein, are oxidized gradually by air entering the cell. The cover plate 24 is made of a heat deformable material. Glass is preferred because of its low oxygen permeability and ease of deformability; however, thermoplastics can be used. The base and cover plate materials must have sufficient rigidity to be self-supporting when standing upright or in a diagonal plane, since flexible plastic sheet materials such as rubber and the flexible or non-rigid vinyls do not have sufficient structural strength to serve as cell casings. The materials which can be used will be referred to herein as essentially inflexible. The base and cover plate materials specified herein are known in the art as materials for casings or walls of electrochromic cells.

The base plate 22 and cover plate 34 may be made of the same or different materials provided at least one is transparent and provided further that the coefficient of thermal expansion, mechanical properties and substrate thicknesses of these materials are appropriately matched. There is a high incidence of cell breakage when these parameters are chosen at random.

In the preferred embodiment shown in FIGS. 1 to 4, the base plate 22 is a thin plate of opaque ceramic material, such as alumina, which serves as the substrate for both the digital display and the counter electrodes. One surface of this substrate 22 may be covered with a thin layer 32 of gold, which in turn is covered by a thin layer 34 (typically about 0.001–0.0015 inch) of an acid resistant insulating material such as a ceramic glaze. A thin layer display electrode 36 of gold or tin oxide (preferably gold) in the form of a plurality of digit segments and associated leads pattern is formed on this glaze layer 34. The background layer 32 and coating 34 can be omitted, in which case the display electrode 36 is applied directly to the surface of the substrate 22. The digit segments as shown are in the conventional 18:88 pattern. Each FIG. 8 has seven digit segments, as is conventional. Each digit segment has a lead 37 (two are shown in FIG. 1). All of the leads terminate along the free edge of the base plate 22. The configuration of the digit segments and their associated leads may be similar to that shown in Fergason U.S. Pat. No. 3,853,392. An additional thin layer of acid resistant insulating glaze coating 38 is applied over the entire area of the leads that is inside the cell, leaving the digit segments themselves and the portions of the leads which are outside the cell (i.e., on the exposed portion 26 of the base plate 22) exposed. A thin layer counter electrode 40 of gold or tin oxide, having one or more leads 41, is then applied on this glaze layer 38, except that it may be omitted at the outer edge of the cell under the seal material 60. Also, a thin gap may be left between the counter electrode and the digit segments to assure that the digital and counter electrodes will be insulated from each other.

The above described base plate 22 and coatings thereon have been described in detail by way of illustration, and the details thereof do not form part of the present invention.

The cover plate has a novel structure which gives the cells of this invention their superior ability to withstand freezing without breaking. The main or central portion 52 of cover plate 24 is spaced from the facing portion of base plate 22, and is preferably flat and parallel to the base plate 22. This main portion 52 is surrounded by a border that includes a sloping peripheral portion 54, preferably of uniform slope, that extends outwardly from the main portion toward base plate 22, and a lip 56 which surround the sloping portion 54. Lip 56 is parallel to and in close proximity with the base plate 22. A thin layer of electrically insulating sealing material 60 bonds the lip to the facing portions of base plate 22 and separates the lip 56 from the base plate 22. While lip 56 can be omitted, a better seal having lower oxygen permeability is formed by providing lip 56. The sloping peripheral portion 54 and the lip 56 preferably extend around the entire perimeter of the cover plate 24, and should extend along a major portion of the perimeter of the cover plate in order to minimize breakage due to freezing.

The main portion 52 of cover plate 24 is planar and is parallel to the inside surface of the base plate 22 and to the counter electrode 40, which are also planar. The cell thickness S, which is the distance between the counter electrode 40 and the inside surface of the central portion 52 of the cover plate, is ordinarily about 0.01 to about 0.04 inch in clock displays, and may be larger or smaller in larger or smaller displays.

The outer part of the peripheral portion 54 (i.e., the part nearest to lip 56) is in proximity with the base plate 22, and is disposed at an acute angle $\theta$ (see FIG. 4), which preferably does not exceed 30°, with respect to the base plate. The cell thickness at the periphery of the cell tapers from a maximum value S down to virtually zero along the boundary line between the sloping portion 54 and the lip 56 of cover plate 24. This gradual tapering of cell thickness at the periphery appears to be highly beneficial in distributing stresses that occur on freezing in such a manner that fracture is avoided.

When the cover plate 24 is in the preferred rectangular shape shown, the sloping peripheral portion 54 is in the form of four plane surfaces, each intersecting the plane of the base plate 22 at an angle which does not exceed 30°. This angle of intersection is denoted by the symbol $\theta$ in FIG. 4. Where the slope angle of peripheral portion 54 is not uniform, the slope angle adjacent to the base plate should not exceed 30°, but the slope angle near the main portion 34 of cover plate 26 can be larger than 30°.

The maximum cell thicknesses S which will not result in cell breakage and the thicknesses of the base and cover plate are inversely correlated in cells of a given size. Thus in cells having a length of about 3.2 inches, a base plate width of 1.75 inches, a cover plate width of 1.35 inches (a size suitable for clock displays), and a peripheral portion width L of 0.125 inch, very little breakage was encountered in cells having cell thicknesses of 0.01 inch (10 mils) and plate thicknesses of about 0.025-0.03 inch (25-30 mils), but considerable breakage was encountered in cells having cell thicknesses of 0.04 inch (40 mils) and plate thicknesses of (25-30 mils). No breakage due to freezing was encountered with cell thicknesses of 40 mils and plate thicknesses of 5 mils; of course, plates this thin are quite fragile and easily broken in other ways. Cells having 20 mils cell thickness and 20 mils plate thickness suffered little breakage due to freezing. In larger cells, the minimum plate thickness would be greater (due to general fragility considerations, not breakage due to freezing) and the maximum cell thickness usable with a given plate thickness should be greater. (A cell thickness of 0.04 inch in the above illustrations corresponds to a slope angle of about 18°).

The preferred electrolyte solution for devices of this invention is an electrically conductive aqueous acidic solution as a disclosed in example 1 of U.S. Pat. No. 3,930,717 to McDermott et al. Other aqueous electrolyte solutions and other electrochromic materials may be used if desired.

The cover plate may be formed by heating a thin sheet of glass to its softening point in a mold, and then cooling the glass slowly to ambient temperature so that it is annealed. The preferred mold is a two part graphite mold. The bottom part of the mold has a raised rectangular abutment in the center, which forms the main or central portion 52 of the cover plate, and a notch leading to one of the edges, which forms the fill hole 28. The top half has a downwardly extending border portion which forms the lip 56 of the cover plate 24. The height of the raised abutment is equal to the desired cell thickness S. When the glass is heated to its softening point, the outer portion which is not supported by the raised abutment on the lower half of the mold will slump, forming the sloping peripheral portion 54 of the cover plate. Hence the molding process may be referred to as slumping. The shaped cover may be referred to as a slumped cover plate, and the cell thickness S (see FIG. 4) may also be designated as the slump height. In a preferred mode of operation, a flat glass sheet is placed in a mold as described, which in turn is placed on a slowly moving conveyor belt that passes through a tunnel furnace having a preheat zone, a combustion (or maximum temperature) zone, and an annealing zone in that order. A non-oxidizing and preferably reducing atmosphere is maintained in the furnace. By way of example, a conveyor belt, traveling at a speed of about 8 to 10 inches per second, passes through a tunnel furnace approximately 20 feet in length and having a preheat zone of about 2 to 3 feet long, a maximum temperature zone of about 6 to 8 feet in length, and an annealing zone comprising the remainder of the furnace. The combustion zone is maintained at about 1600°-1700° F, the exact temperature being dependnet on the softening point of the glass being treated. A reducing atmosphere obtained by partial combustion of a fuel and having a specific gavity of about 0.97 (air equals 1.00) is maintained in the furnace. As a mold and glass sheet are passed through the tunnel furnace, the glass is heated from room temperature of a temperature above the softening point (approximately 1600°-1700° F) in the preheat zone, maintained at this temperature in the maximum temperature zone, and then gradually cooled to room temperature in the annealing zone.

While this invention has been described with particular reference to one electrode configuration, it will be understood that other electrode configurations can be used in constructing cells according to this invention. The cell may have a parallel electrode arrangement, such as that shown in Manos U.S. Pat. No. 3,541,741 and Kissa et al. U.S. Pat. No. 3,453,038, cited supra, in which a thin layer digital electrode is formed on the inside surface of the base plate, and in which a transparent electrode is formed as a thin coating on the inside surface of cover plate 24. This construction is particularly desirable for transparent cells, i.e., cells in which both the base plate 22 and the cover plate 24 are transparent. The digital electrode 36 may be either gold or tin oxide when an opaque ceramic substrate is used; however, tin oxide should be used on glass substrate since gold does not have optimum electrical properties when applied in a layer thin enough to be transparent. Alternatively, an electrochromic cell according to this invention may have a coplanar electrode arrangement, such as that shown in U.S. Pat. No. 3,912,368 to Pongee et al., in which both the digital display electrode and the counter electrode are thin layer coatings on the inside surface of the base plate 22 substrate. Parallel and coplanar electrode devices may be viewed in either direction, and an opaque background may be provided behind the back plate 22 or 24 if desired.

Base plate 22 and cover plate 24 have been illustrated as rectangular. Other base plate shapes, such as circular, oval and oblong may be used. The cover plate has generally the same shape as the base plate, although it is convenient to provide the base plate with an exposed area that is not covered by the cover plate in order to facilitate electrical connections with an external display actuator circuit.

The base plate, although preferably flat or planar, may be curved, e.g., as a portion of a cylinder or sphere having a radius of curvature much larger than the thickness of the device, if desired. When a curved base plate is used, it is preferable to use cover plate whose main portion is of similar curvature, so that the opposed surfaces of the base plate and the main portion of the cover plate will be parallel.

In addition to being resistant to fracture due to freezing of the aqueous electrolyte medium, the cells of this invention also have lower oxygen permeability than the cells of Manos and Kissa when the same sealing materials are used, since the instant cells have only a single layer 60 of sealing material instead of two layers as in Manos and Kissa.

While the invention has been described with respect to electrochromic cells, the teachings of this invention are applicable to other cells, and particularly to ther optical cells, having breakable walls or casings and containing an aqueous medium.

What is claimed is:

1. A sealed optical cell containing an aqueous medium and comprising an essentially inflexible base plate and an essentially inflexible dished cover plate, at least one of which is transparent, joined together and forming opposed walls of said cell, said cover plate including a central portion spaced from said base plate and a sloping peripheral portion extending outwardly from said central portion toward the base plate, the outer part of said peripheral portion being adjacent to said base plate and disposed at an acute angle thereto.

2. A cell according to claim 1 in which the base plate is flat.

3. A cell according to claim 1 in which the central portion of said cover is parallel to the facing portion of the base plate.

4. A cell acording to claim 1 in which the base plate and the central portion of the cover plate are flat and have parallel inside surfaces.

5. A cell according to claim 1 in which said peripheral portion extends around the entire perimeter of said cover plate.

6. A cell according to claim 1 in which said acute angle is not greater than 30°.

7. A cell according to claim 1 in which said cover plate also includes a lip extending outwardly from said peripheral portion, said lip having a surface in facing relationship with a portion of said base plate.

8. In an electrooptical cell having opposed first and second plates, at least one of which is transparent, and containing first and second electrodes, an aqueous electrolyte solution in contact with said electrodes, and a material which undergoes a reversible change in color and/or optical density upon the application of an electric field, the improvement wherein said second plate includes a central portion spaced from said first plate and a sloping peripheral portion extending outwardly from said central portion toward said first plate, the outer part of said peripheral portion being adjacent to said base plate and disposed at an acute angle thereto.

9. A cell according to claim 8 in which said peripheral portion extends around the entire perimeter of said second plate.

10. A cell according to claim 8 in which said second plate also includes a lip extending outwardly from said peripheral portion, said lip having a surface in facing relationship with a portion of said first plate.

11. A cell according to claim 8 in which said first plate and the central portion of said second plate are flat and parallel.

12. An electrooptical cell according to claim 8 in which the material which undergoes a reversible change is an electrochromic material.

* * * * *